April 20, 1937.  H. W. CARDWELL  2,077,741
SIDE BOOM AND WINCH ATTACHMENT FOR TRACTORS
Filed Jan. 31, 1936  2 Sheets-Sheet 1
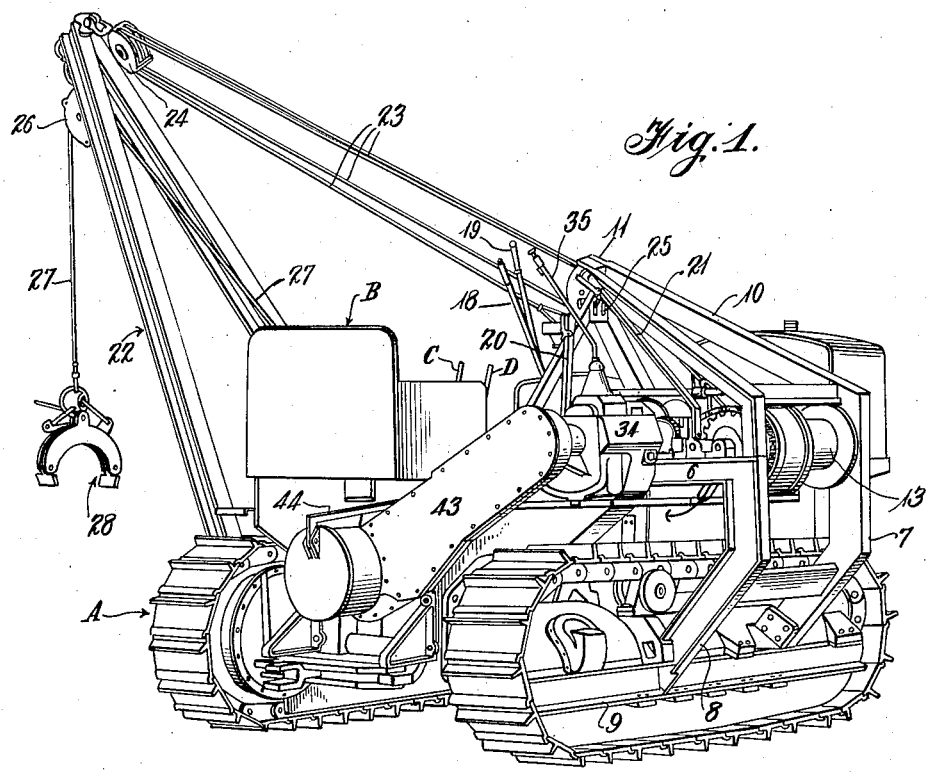
Fig. 1.
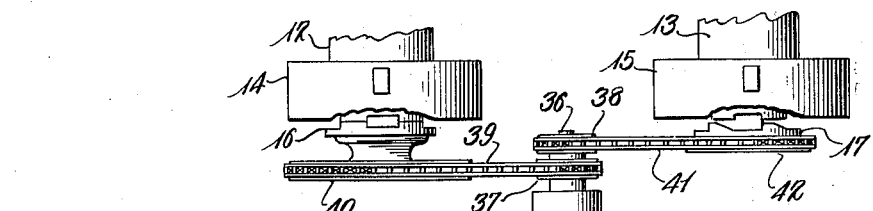
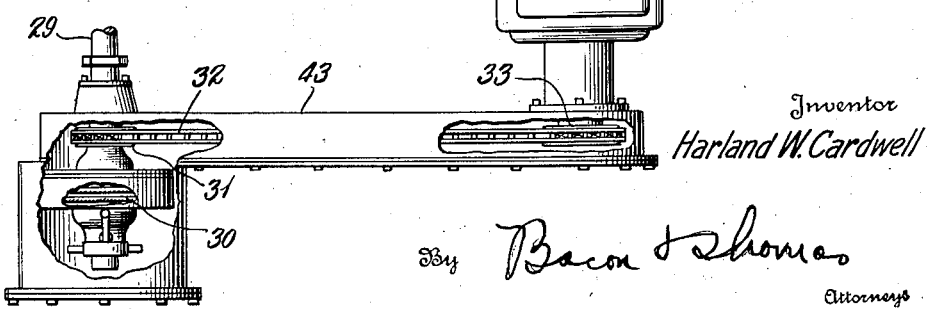
Fig. 3.
Inventor
Harland W. Cardwell
By Bacon & Thomas
Attorneys

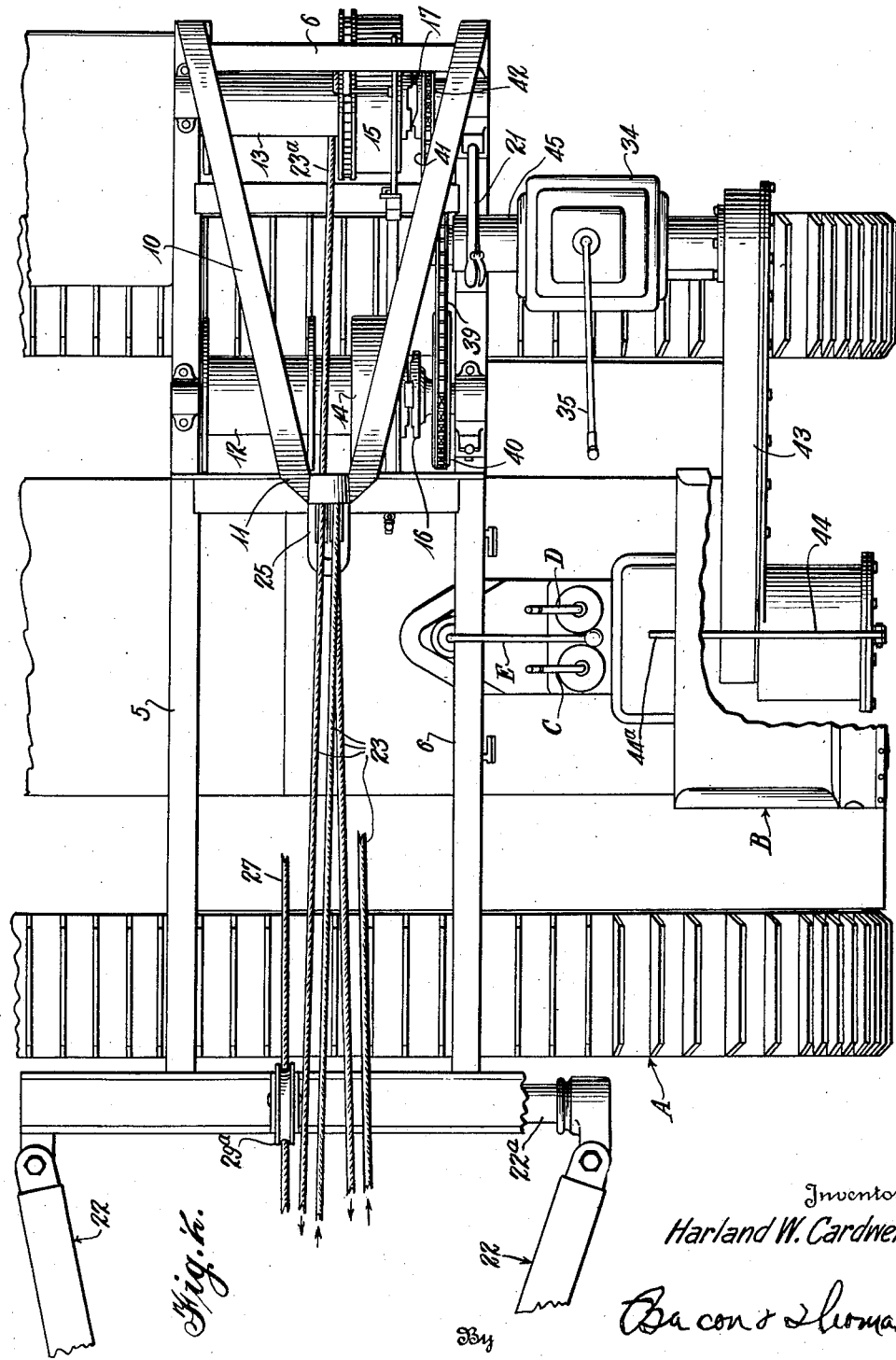

Patented Apr. 20, 1937

2,077,741

UNITED STATES PATENT OFFICE 2,077,741

SIDE BOOM AND WINCH ATTACHMENT FOR TRACTORS

Harland W. Cardwell, Wichita, Kans., assignor to All Steel Products Manufacturing Company, Wichita, Kans., a corporation of Kansas Application January 31, 1936, Serial No. 61,829

7 Claims. (Cl. 212—8)

This invention relates to new and useful improvements in side boom and winch attachments for tractors.

The primary object of the invention is to provide an attachment for tractors which includes a boom and its operating winch mechanism with the boom associated with the tractor in such a manner that it will operate at one side of the tractor, whereby the entire assembly is especially adapted for use as a pipe laying machine.

A further important object of the invention is to provide a boom and winch attachment for tractors which is adapted to be arranged in such a manner that the winch mechanism of the attachment will counter-balance the weight of the boom and its load.

A still further important object of the invention is to provide a side boom and winch attachment for tractors wherein the various control levers for the mechanism of the attachment will be conveniently located with respect to the operator's seat of the tractor.

Another object of the invention is to arrange the various instrumentalities of a side boom and winch attachment for tractors so that they will not reduce the visibility of the operator of the tractor during movement of the latter over a right-of-way, or while operating the attachment for laying pipe, or the like.

Other objects and advantages of the invention will be apparent during the course of the following description:

In the accompanying drawings forming a part of this specification, and in which like numerals are employed to designate like parts throughout the same, Figure 1 is a perspective view of the side boom and winch attachment embodying this invention properly associated with one type of tractor;

Figure 2 is a detail, top plan view of the attachment embodying this invention and illustrating the manner of associating the various instrumentalities of the attachment with reference to its associated and supporting tractor; and Figure 3 is a detail plan view, partly broken away, of the power drive between the tractor and the drums of the winch mechanism.

In the drawings, wherein for the purpose of illustration is shown a preferred embodiment of this invention, the reference character A is employed for designating in its entirety the tractor on which the side boom and winch attachment is mounted. The tractor illustrated is of the crawler type, but it is to be understood that I do not desire to limit myself to this particular type of tractor, for the attachment embodying this invention can be associated with any other form of tractor with minor changes in the form of connecting elements between the attachment and the tractor. Conventionally associated with the tractor A is the operator's seat B. Conveniently arranged with reference to this seat are the control levers C, D and E for the tractor.

The side boom and winch attachment comprises a pair of parallel beam members 5 and 6 which are provided at their opposite ends with suitably formed, depending extensions 7 and 8, respectively, for attaching the beams 5 and 6 to the tractor track frame members 9, as generally illustrated in Fig. 1. The drawings illustrate the mounting for one end only of each of the members 5 and 6, as it is believed to be unnecessary to illustrate the mounting of the remaining ends of these members, for the specific form of mounting constitutes no part of this invention. It is understood that the parallel beam members 5 and 6 extend transversely of the tractor A and constitute the main frame portion of the attachment. One end portion of this main frame has suitably associated therewith an A-frame 10 which is suitably fabricated and is arranged to have its head or crown portion 11 spaced vertically a suitable distance from the plane occupied by the parallel beam members 5 and 6.

Properly associated with and mounted on the end portion of the main frame with which the A-frame 10 is associated are the winding drum 12 and the boom drum 13. These drums are arranged in parallelism and are located entirely on one side of the longitudinal center line of the tractor. These drums are provided with brake drums 14 and 15, respectively, and with controlled clutches 16 and 17, respectively. Figs. 1 and 2 disclose the various levers 18, 19, 20 and 21 for the various brake and clutch mechanisms. The trains of mechanical elements employed for connecting these various winch control levers to their respective brakes and clutches have not been disclosed as they form no part of this invention. It will be noted, however, that these various control levers, 18 to 21, inclusive, are arranged at the right of the operator's seat B so that they all may be conveniently manipulated by the right hand of the operator.

The side boom designated in its entirety by the reference character 22 is suitably, pivotally mounted on the shaft 22a which is supported in a convenient manner on the left hand end portion of the main frame of the attachment. The specific form of mounting for this boom has not been illustrated. The boom 22 is manipulated by means of the cable 23 which is trained over the crown block 24, attached to the crown of the boom, and with one end, 23a, of this cable suitably attached to the boom drum 13. The remaining end of the cable is suitably attached to the crown 11 of the A-frame 10. This cable 23 also is trained over a suitable block 25 carried by the crown 11.

The top of the boom 22 also has properly attached thereto a block 26 over which is trained the cable 27 for operating the pipe hook, or other suitable grappling member 28. The cable 27 is trained under the pulley 29a, located at the base of the boom, and extends to the winding drum 12 to have its end properly attached to this drum.

Fig. 3 discloses in detail the drive for the winding and boom drums 12 and 13. The tractor is provided with a rearwardly extending power take-off shaft 29. The outer end of this shaft has properly associated therewith a twin disk friction clutch 30. The driven portion of this clutch mechanism has operatively associated therewith a power take-off sprocket 31 over which is trained the chain 32. This chain extends to, and is trained over, the sprocket 33 which is mounted on the power input or drive shaft for a four-speed transmission unit 34. A gear shift lever 35 is provided for controlling the operation of this variable speed transmission unit. It will be noted by examining Figs. 1 and 2, that this gear shift lever 35 of the transmission is conveniently located with respect to an operator occupying the seat B of the tractor, and may be manipulated by the right hand of said operator.

The power output or driven shaft 36 for the transmission unit 34 has suitably keyed thereto the sprockets 37 and 38. Trained over the sprocket 37 is a chain 39 which in turn is trained over a sprocket 40 operatively connected to the driving portion of the clutch 16 for the winding drum 12. A chain 41 is trained over the sprocket 38 and over a sprocket 42, which is operatively connected with the drive member of the clutch 17 for the boom drum 13.

The various figures disclose a housing or casing 43 which is dust-proof and which functions to enclose the twin disk friction clutch mechanism 30 and the sprocket and chain drive from this clutch to the power input or drive shaft of the variable speed transmission unit 34. This housing or casing 43 is properly, rigidly, attached to the tractor at one end so that the remaining end may be employed for supporting the power input end of the variable speed transmission unit 34. A control lever 44 extends outwardly of the portion of the casing or housing 43 which encloses the twin disk friction clutch 30 and extends under the seat B for the tractor so that its operating end 44a will be conveniently arranged for the operator.

The casing portion 45, which encloses the power output shaft 36 of the transmission unit 34, is suitably secured to the frame member 6 of the attachment for supporting this power output end of the transmission unit 34.

It is believed that the operation of this side boom and winch attachment for tractors will be readily understood from the drawings and the above description. It might be stated, however, that an operator located on the seat B, by actuating the lever 44, may operatively connect the winch mechanism of the attachment to the power plant of the tractor. Either drum 12 or 13 may be actuated as desired by the operator by properly manipulating the control levers 19 to 21, inclusive. The speed of actuation of the operated drum may be readily controlled by varying the speed setting of the transmission unit 34 through the medium of its lever control 35. This attachment may be operated either with the tractor remaining stationary, or the grappling hook 28 may be raised or lowered by means of the winch mechanism while the tractor is being driven over a right-of-way. Of course, the setting of the boom 22 may be varied either while the tractor is stationary or while it is traveling. The arrangement of all of the controls for the winch mechanism convenient to the right hand of the operator so that the tractor controls may be actuated by the operator's left hand and permit the attachment and tractor to be controlled simultaneously.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. The combination with a tractor, of a frame mounted on the tractor to extend transversely thereof, a boom mounted on one end portion of the frame, a pair of drums mounted in parallelism on the remaining end portion of the frame, operating cables extending between said drums and the boom, a variable speed transmission unit operatively connected to both of said drums with the longitudinal axis of the transmission unit arranged on a vertical plane extending between the said parallel drums, and a power take-off drive from the power plant of the tractor to said transmission unit.

2. The combination with a tractor having a rearwardly extending take-off shaft, of a transversely extending frame mounted on the tractor, a winch mechanism mounted on one end portion of the frame, a boom mounted on the opposite end portion of the frame, a variable speed transmission unit operatively connected to the winch mechanism, means for mounting one end of the transmission unit on said frame, a drive connection between the power take-off shaft of the tractor and the power input end of the transmission unit, a housing for enclosing said power drive secured to the tractor at one end and supporting the power input end of the transmission unit, and control levers for the transmission unit and the winch mechanism.

3. The combination with a tractor, of a frame extending transversely of the tractor and secured at its ends to the opposite sides of the latter, a boom mounted on one end portion of said frame to operate at one side of the tractor, a winch mechanism including a variable speed transmission unit for operating the boom mounted on the other end portion of the frame to act as a counterweight for said boom and its load, and power take-off means including a friction clutch for driving the winch mechanism from the power plant of the tractor.

4. The combination with a tractor having a rearwardly extending take-off shaft, of a transversely extending frame mounted on the tractor, a winch mechanism mounted on one end portion of the frame, a boom mounted on the opposite end portion of the frame, a variable speed transmission unit operatively connected to the winch mechanism, means for mounting one end of the transmission unit on said frame, a friction clutch associated with the take-off shaft, a drive connection between said friction clutch and the power input end of the transmission unit, a housing for enclosing said power drive secured to the tractor at one end and supporting the power input end of the transmission unit, and control levers for the transmission unit and winch mechanism.

5. The combination with a tractor having a rearwardly extending power take-off shaft, of a friction clutch associated with the outer end of said shaft, a transversely extending frame mounted on the tractor, a winch mechanism mounted on one end portion of the frame, a variable speed transmission unit operatively connected to the winch mechanism and disposed on the winch mechanism side of the frame, a boom mounted on the opposite end of the frame and a drive connection between the friction clutch and the power input end of the transmission unit.

6. The combination with a tractor having a rearwardly extending power take-off shaft, of a clutch associated with the outer end of said shaft, a winch mechanism mounted on one side of the tractor, a variable speed transmission unit operatively connected to the winch mechanism and mounted on the winch mechanism side of the tractor, a boom mounted on the opposite side of the tractor and a drive connection between the clutch and the power input end of the transmission unit.

7. In combination with a tractor having a rearwardly extending power take-off shaft, a friction clutch associated with the outer end of said shaft, a boom mounted on said tractor, a winch mechanism for operating said boom, a variable speed transmission unit operatively connected to the winch mechanism, said winch mechanism and variable speed transmission unit being positioned on the tractor to counterweight the boom and its load, and a drive connection between the friction clutch and the power input end of the transmission unit.

HARLAND W. CARDWELL.